US005558201A

United States Patent [19]

Oppliger et al.

[11] Patent Number: 5,558,201

[45] Date of Patent: Sep. 24, 1996

[54] CONVEYOR APPARATUS FOR FURTHER CONDUCTING INDIVIDUALLY SUPPLIED, FLAT PRODUCTS

[75] Inventors: Jean-Claude Oppliger, Niederhasli; Robert Grünenfelder, Oberembrach; Willy Maier, Kloten, all of Switzerland

[73] Assignee: Grapha-Holding AG, Hergiswil, Switzerland

[21] Appl. No.: 288,245

[22] Filed: Aug. 9, 1994

[30] Foreign Application Priority Data

Aug. 10, 1993 [CH] Switzerland .......................... 02378/93
Jun. 21, 1994 [CH] Switzerland .......................... 01962/94

[51] Int. Cl.[6] .................................................... B65G 47/04
[52] U.S. Cl. ........................................ 198/476.1; 198/704
[58] Field of Search ............................. 198/476.1, 484.1, 198/704, 712, 713, 803.13, 803.8, 845

[56] References Cited

U.S. PATENT DOCUMENTS 2,689,657 9/1954 Lens .
3,915,293 10/1975 Melchiorre et al. .
4,567,988 2/1986 Weibel .
5,096,047 3/1992 Morikiyo et al. .

FOREIGN PATENT DOCUMENTS 0529301 7/1992 European Pat. Off. .
WO90/03853 4/1990 WIPO .

*Primary Examiner*—D. Glenn Dayoan
*Attorney, Agent, or Firm*—Spencer & Frank

[57] ABSTRACT

A conveyor apparatus for further transporting individually conveyed, flat products includes a rotatingly driven pulling element and spaced receiving apparatuses that can be loaded and emptied secured to the pulling element for being moved in a conveying direction. The receiving apparatuses each included two side walls which are respectively spaced in the conveying direction and form a receiving chamber having an opening for the products. A mechanism is provided for widening the opening in the receiving chamber of the respective apparatuses for loading product into the chamber and a further mechanism is provided for moving the receiving apparatuses into a hanging position with a predetermined inclination in which the openings are downwardly-oriented so that the product can be ejected through the opening.

10 Claims, 8 Drawing Sheets

2
2
1
2
3
4
4
5
5
6
7
8
9
9
10
10
11
12
12
12
14
14
14
15
15
15
15
16
16
16
17
17
18
19
19
19
20
20
20
22
22
23
33
7,8
6

CONVEYOR APPARATUS FOR FURTHER CONDUCTING INDIVIDUALLY SUPPLIED, FLAT PRODUCTS

CROSS-REFERENCE TO RELATED APPLICATIONS

This application claims the right of priority with respect to applications CH 02 378/93-0 filed on Aug. 10, 1993, and CH 01 962/94-0 filed Jun. 21, 1994, in Switzerland, the disclosures of which are incorporated herein by reference.

BACKGROUND OF THE INVENTION

The present invention relates to a conveyor apparatus for further transporting individually supplied, flat products such as mailing pouches, printed products or work pieces, having a rotatingly driven pulling element, to which are secured spaced receiving apparatuses that can be loaded and emptied. The receiving apparatuses each have two side walls spaced in the conveying direction which form a receiving chamber that has an opening for the products.

Such apparatuses are known in the postal service as distributing conveyors for relatively flat mailing pouches which have an uneven outer shape resulting from the contents, and therefore must meet stringent requirements in mechanized processing due to the necessary reliability.

European Patent Application 0,529,301, discloses a generic apparatus in which the receiving apparatuses are containers respectively having an upper loading opening and a lower ejection opening, and are laterally secured to a pulling element. For precise and gentle ejection of the products, it is necessary to provide apparatuses below the containers, at the points of ejection, into which the products are brought into a suitable diagonal position and can be conveyed below into the prepared containers. These apparatuses must have a substantial structural height. The conveyor path is, for practical reasons, limited to an oval and a climb to an upper level is thus hardly possible.

In a known conveyor apparatus, a so-called flat sorter produced by AEG of Germany, the mailing pouches to be distributed, which have uneven or diverse outer shapes due to their contents, are leaned against a horizontally rotatingly driven wall and moved toward the individual distribution stations. From the individual distribution stations, the mailing pouches are carried away from the conveyor belt by means of a lifting element, which grips behind the mailing pouches, and are ejected into the corresponding distribution conduit. The mailing pouches are thereby displaced into an undefined position so that they cannot be further processed, for example addresses cannot be read, without additional effort.

The option of further transporting the mailing pouches by means of grippers can potentially worsen handling, because a different thickness distribution can lead to gripping problems, and/or a momentarily nondetachable adherence can result from the gripping pressure.

SUMMARY OF THE INVENTION

It is an object of the present invention to create a conveyor apparatus of the type mentioned at the outset, by means of which the described drawbacks are eliminated to the greatest possible extent, and which assures optimum utilization of space.

The above and other objects are accomplished in accordance with the invention by the provision of a conveyor apparatus for further transporting individually conveyed, flat products, comprising: a rotatingly driven pulling element; spaced receiving apparatuses that can be loaded and emptied secured to the pulling element for being moved in a conveying direction, the receiving apparatuses each including two side walls which are respectively spaced in the conveying direction and form a receiving chamber having an opening for the products; means for widening the opening in the receiving chamber of the respective apparatuses for loading product into the chamber; and means for moving the receiving apparatuses into a hanging position with a predetermined inclination in which the openings are downwardly-oriented so that the product can be ejected through the opening.

Because the openings of the apparatus of the invention can be widened for loading, the receiving apparatuses can be significantly narrower than before, and, with equal spacing between the receiving apparatuses, the spaces between them can therefore be larger. These spaces can be so large that even comparably narrow inside curves and S-curves can be negotiated. The spatial accessibility of the apparatus and thus the required optimum use of space are thereby assured.

Because, for the purpose of ejection, the receiving apparatuses can be moved respectively into a hanging position having a certain incline, the products, already in the receiving apparatuses, can be brought into a position from which they can slide gently into the containers provided for further transport. A space-consuming and expensive intermediate station can therefore be omitted.

Thus, the apparatus of the invention, which uses less space, has at least the same conveying output and handles the products gently, can be configured to be spatially accessible and, in particular, be configured in two or more levels.

BRIEF DESCRIPTION OF THE DRAWINGS

The invention is described in detail below by way of two embodiments illustrated in the drawing figures.

DESCRIPTION OF THE PREFERRED EMBODIMENTS

Figures 1, 2:
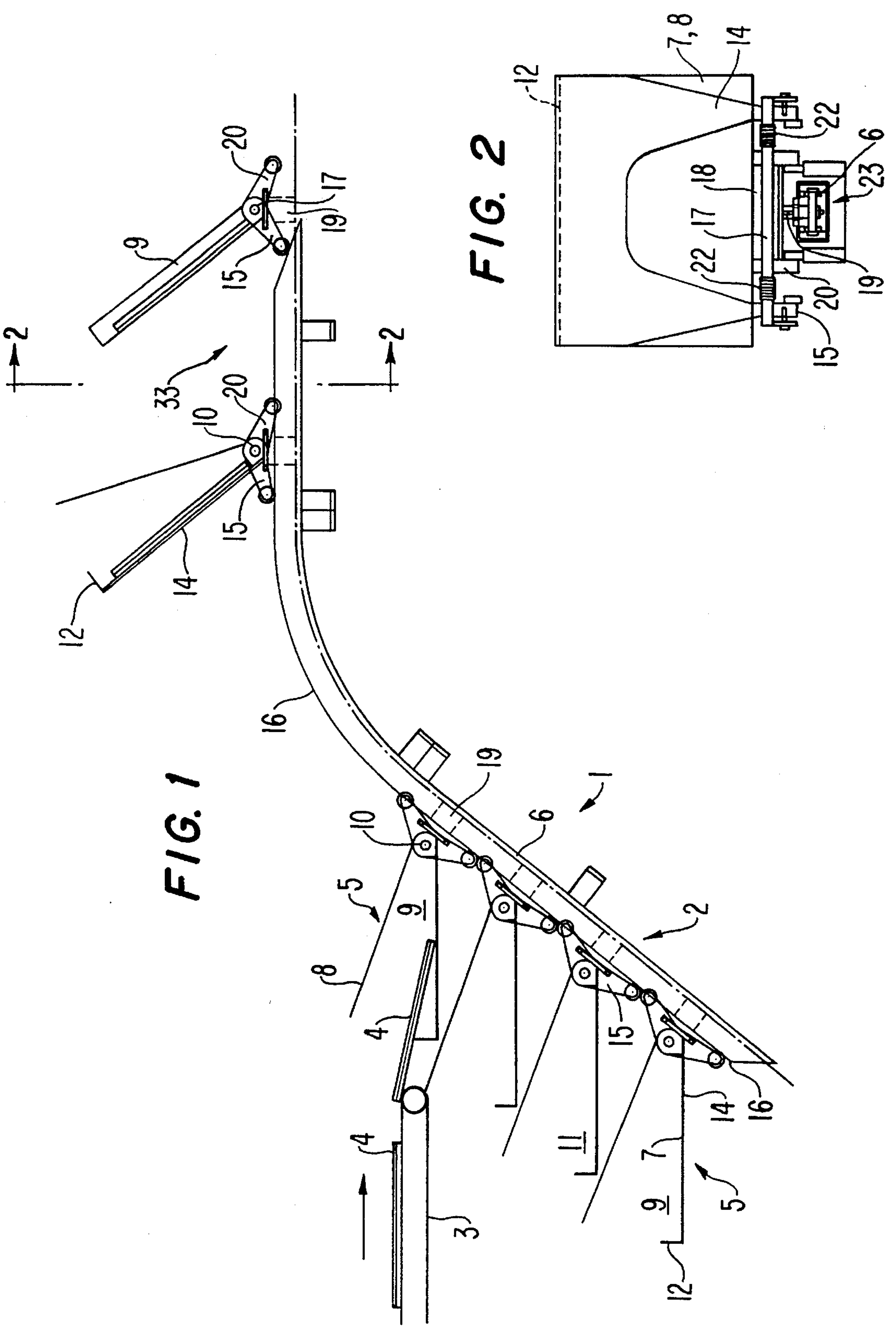
FIG. 1 is a side view of the loading segment of the conveyor apparatus according to one embodiment of the invention.
FIG. 2 is a cross-section through the conveyor apparatus along line 2—2 in FIG. 1.

Referring to FIG. 1, there is shown a conveyor apparatus 1 of the invention in the region of a loading segment 2 and an adjoining conveyor segment. Flat products 4 conveyed on a conveyor belt 3 are conveyed into an opened receiving apparatus 5, which apparatuses are secured with spacing therebetween to a rotatingly driven pulling element 6 (indicated in dot-dash lines). Receiving apparatuses 5, which can be loaded and emptied, have two side walls 7, 8 spaced in the conveying direction and forming a receiving chamber 9 for the conveyed flat products 4. Side wall 7 is fixedly connected to pulling element 6, and assumes a fixed position which is diagonal with respect to the pulling element and has a free end pointing in a direction counter to the conveying direction. Side wall 8 is connected to pulling element 6 for pivoting around a horizontal axis defined by a shaft 10 that extends transversely to the conveying direction. The pivotable end of side wall 8 determines the extent of opening 11 of receiving chamber 9 which has an associated stop plate 12 that can be pivoted back and forth by way of a connecting arm 14. Stop plate 12 is responsible for products 4 remaining in receiving chamber 9 when the latter is turned around shaft 10 on the way to emptying segment 13 (FIG. 3), and holds products 4 in a defined position prior to emptying. Stop plate 12 is seated to pivot around shaft 10 by connecting arm 14 connected thereto, and when opening 11 is closed, connecting arm 14 rests against the rear side of side wall 7 fixedly connected to pulling element 6.

On loading segment 2, side walls 7 fixedly connected to pulling element 6, occupy a horizontal position, so that products 4 moved with conveyor belt 3 can pass stop plate 12, which projects upwardly, unencumbered and at the right time.

Of course, it would be possible to steer stationary side wall 7 into a diagonal position, and/or first displace stop plate 12 into the projecting position after loading, in which case a further control function would be required.

The movements of pivotable side walls 8 are effected by means of a control lever 15, which is connected so as to trail after the pivotable side wall 8, and is triggered by a guide track 16. Connecting arm 14, which is provided with stop plate 12, reaches the illustrated position supported against pulling element 6 by means of a spring force.

In the region of loading segment 2, the conveying direction of pulling element 6 extends diagonally upwardly, and subsequently changes to sink or become horizontal. Guide track 16 ends directly following loading segment 2, whereupon the pivotable side wall 8 inclines toward the stationary side wall in order to form a closed receiving chamber 9 when stop plate 12 is raised.

In FIG. 2, connecting arm 14, which is provided with recesses in order to reduce its weight, can be seen along with stop plate 12 and side wall 8. Both side wall 8 and connecting arm 14 are disposed on shaft 10. The latter is configured as a shaft 17, and is seated in a support 18 secured to pulling element 6. For the sake of simplicity, an adapter 19 is provided as a connection between pulling element 6 and support 18.

Both the pivotable side wall 8 and connecting arm 14 of stop plate 12 are pivotably seated in support 18 on shaft 17.

The movable side wall 8 and stop plate 12 are actuated by means of control levers 15, 20, which are drivable by means of guide tracks 16, 21 (see FIGS. also 3 and 4).

Both the movable side wall 8 and connecting arm 14 together with stop plate 12 are respectively displaced into a resting position by a coil spring 22. In this position, the rear side of the stationary side wall 7 forms a resting position for connecting arm 14 and stop plate 12, and a pivot stop (not shown) forms a resting position for the pivotable side wall 8 against a stationary element of receiving apparatus 5 or pulling element 6. That is to say, in FIG. 1 the pivotable side wall 8 is lifted counter to the force of coil spring 22 by means of control lever 15 running onto guide track 16, whereas when leaving guide track 16 under a spring force effect, the pivotable side wall 8 pivots back into its resting position, in which it forms a closed receiving chamber 9 with stop plate 12. Control lever 15 is thus associated with the pivotable side wall 8. Control lever 20, on the other hand, causes the lifting movement of connecting arm 14. FIG. 2 further shows a guide conduit 23, in which pulling element 6, in this case a conveyor chain, extends.

Figure 4:
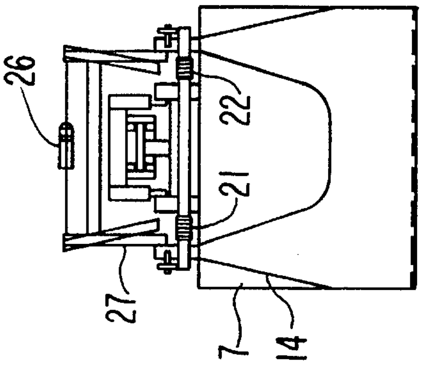
FIG. 4 is a cross-section through the conveyor apparatus along line 4—4 in FIG. 3.
Figure 3:
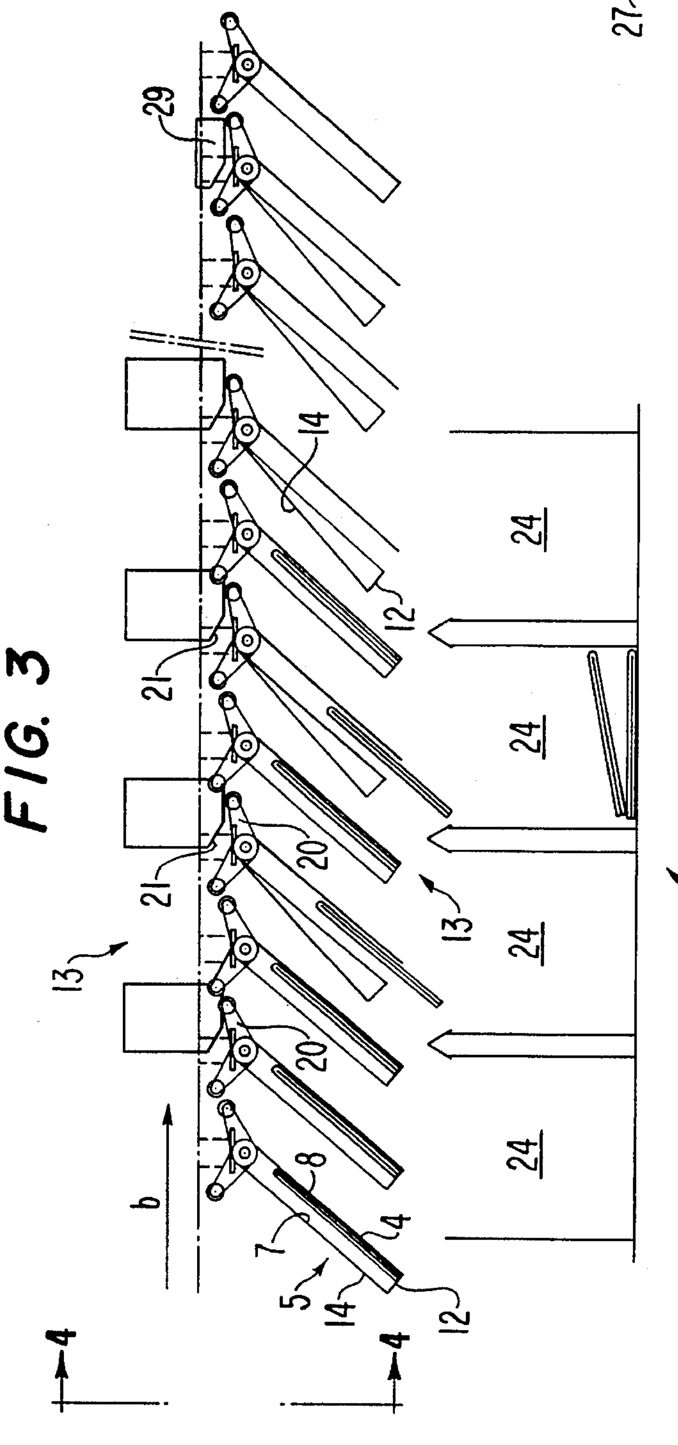
FIG. 3 is a side view of the emptying segment of the conveyor apparatus of FIG. 1.

FIGS. 3 and 4 show the region in which receiving apparatuses 5 are emptied above receiving compartments 24 respectively associated with them. With respect to FIG. 3, a conveying movement from left to right was selected, so that a mirror-inverted viewpoint of the conveying apparatus in FIG. 3 represents a connection to FIG. 1.

After receiving apparatuses 5 have left loading segment 2 and receiving chamber 9 is closed, the path prior to emptying receiving apparatuses 5 by means of a reversing loop 31 leads to a horizontal emptying segment 13, on which receiving apparatuses 5 are driven in a hanging, below grade position, as shown in FIG. 3.

Figure 7:
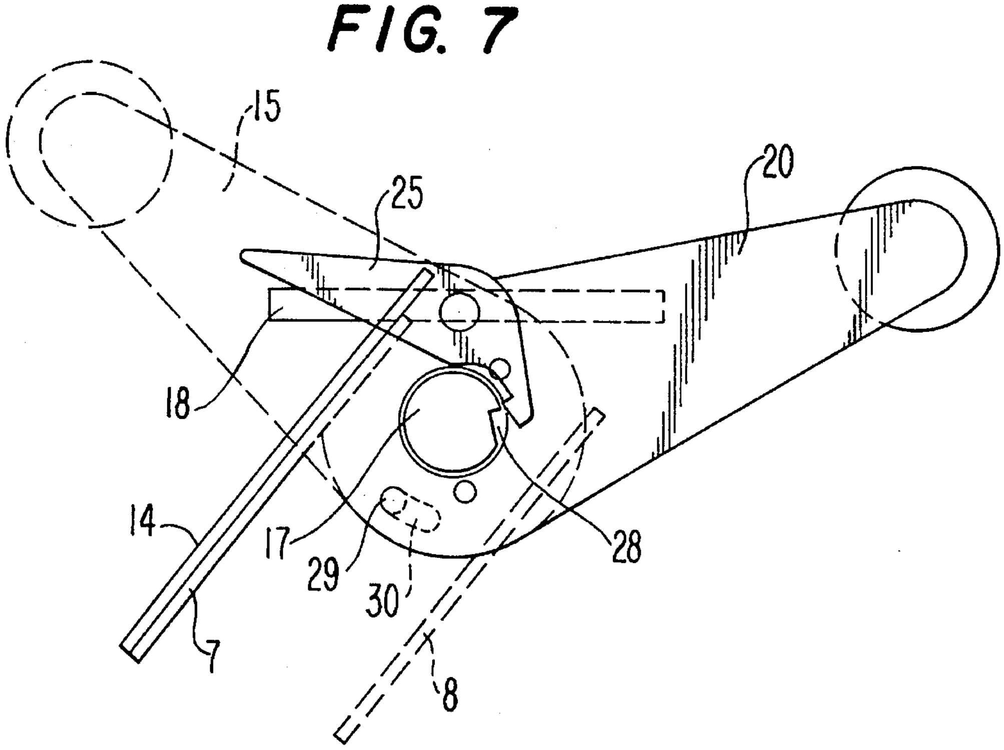
FIG. 7 is a view of a non-engaged locking apparatus for use in the embodiment of FIG. 1.
Figure 8:
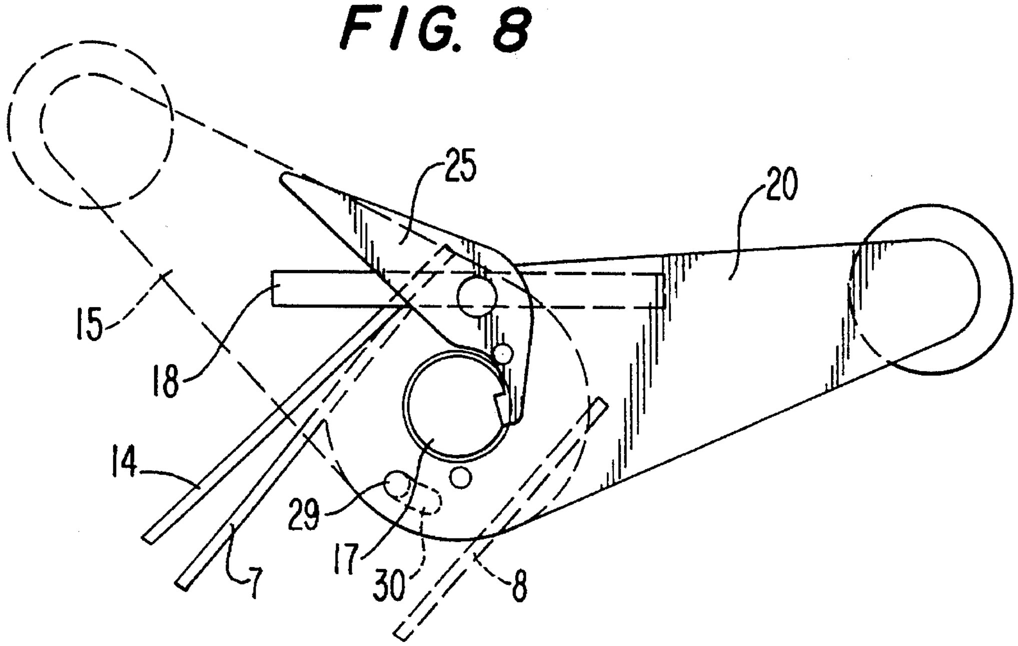
FIG. 8 shows the locking apparatus of FIG. 7 with the pawl engaged.

By means of a guide track 21, which is associated with each receiving compartment 24 and can be switched to be operative or non-operative, a product 4 can be allocated to a corresponding receiving compartment 24, by means of which a specific distribution of products 4 can be effected. Control lever 20 running onto the (laterally) connected guide track 21 for emptying a receiving apparatus 5 triggers a lifting of connecting arm 14 from the rear side of the stationary side wall 7, or the unblocking of receiving chamber 9, so that product 4 falls into the specific receiving compartment 24. The open position of the receiving apparatus 5 affected by emptying is locked by means of a pawl 25 engaging a recess 28 inlaid in shaft 17, and unlocked after leaving emptying segment 13 (see FIGS. 7 and 8).

Switching guide track 21 has an operative (controlling) position and a non-operative position as shown in FIG. 4. By means of a lever 27 actuated by a piston-cylinder unit 26, guide track 21 is displaced from the side into the path of movement of control lever 20, which unblocks the opening of receiving chamber 9 by removing stop plate 12. The locking apparatus 25, 28 provided on both sides of pulling element 6 due to an insufficient rigidity against torsion of a locking apparatus 25, 28 on one side. When control lever 20 runs onto guide track 21, according to FIGS. 7 and 8, pawl 25 for locking the open position of receiving apparatus 5 engages recess 28 in shaft 17; the release of the open position is effected following emptying segment 13 by means of an unlocking apparatus 29.

Figure 5:
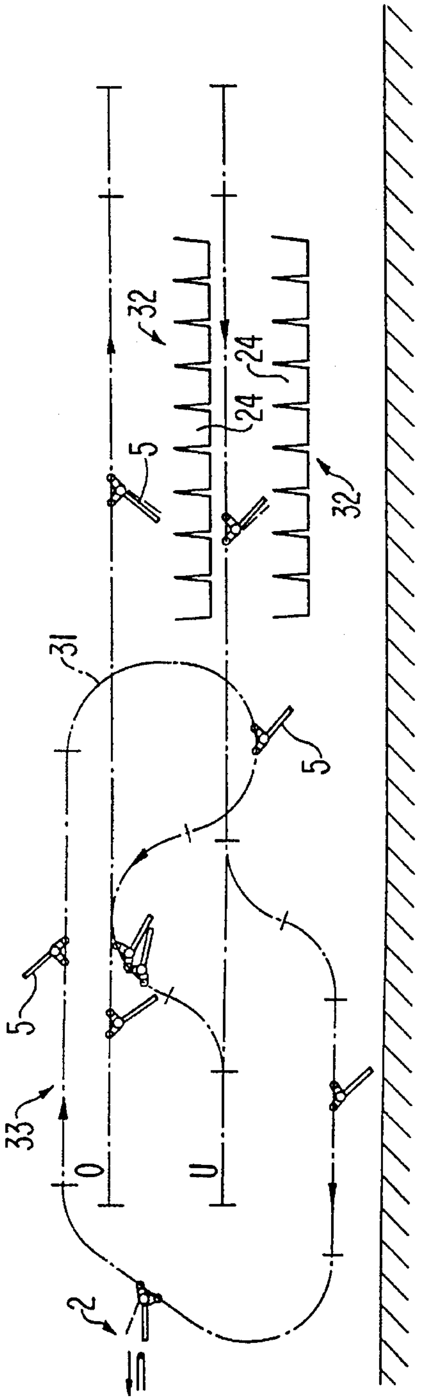
FIG. 5 is a side view of a schematically represented system including the conveyor apparatus of the invention.
Figure 6:
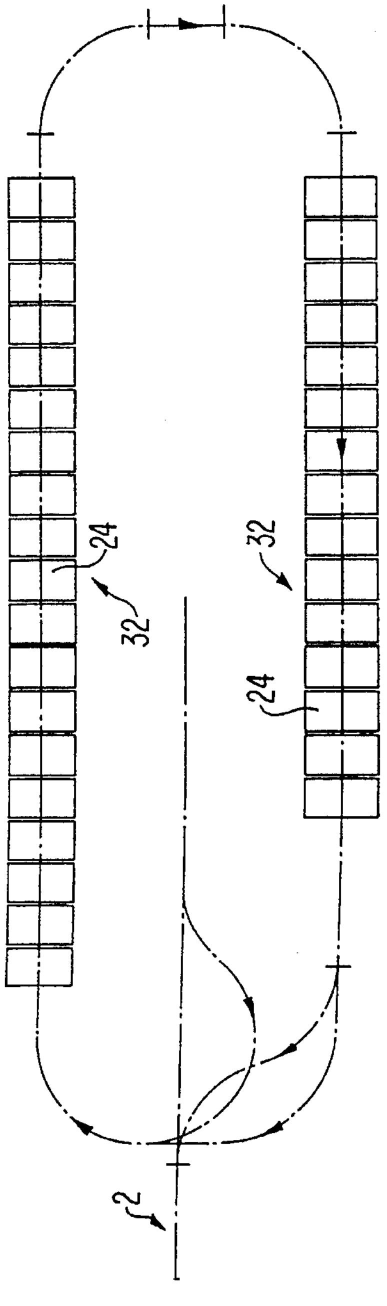
FIG. 6 is a top view of the system of FIG. 5.

The conveyor apparatus 1 of the invention in the context of a conveyor system is shown in FIGS. 5 and 6. Starting from loading segment 2, after passing through a reversing loop 31, receiving apparatuses 5 can be emptied on different levels, thus making optimum use of available space and permitting adjacent chambers to be included. Following reversing loop 31, receiving apparatuses 5 located with products 4 reach an upper level O and subsequently pass a rear row of receiving compartments 24 and a row located opposite on the same level. Afterward, pulling element 6 leaves this height and reaches the lower-lying level U, where further receiving compartments 24 are prepared for loading, as on level O. In the S-loop, pulling element 6 returns to loading segment 2 following receiving compartments 24.

In the embodiment according to FIGS. 9 through 14, which is structurally even simpler than the above-described embodiment, receiving compartments 40 each have a stationary side wall 41, a side wall 43 seated on this wall so as to pivot around a horizontal shaft 42, and a seal 44 having a flap 45 which is pivotably seated on side wall 43. As shown, the stationary side walls 41 are respectively disposed in a constant diagonal position with respect to the conveying direction indicated by arrow 46, and preferably fixedly secured to a holding element 47 of a chain link 48 of pulling element 6. The position of the receiving apparatuses is thus determined by the position of chain links 48.

Figure 9:
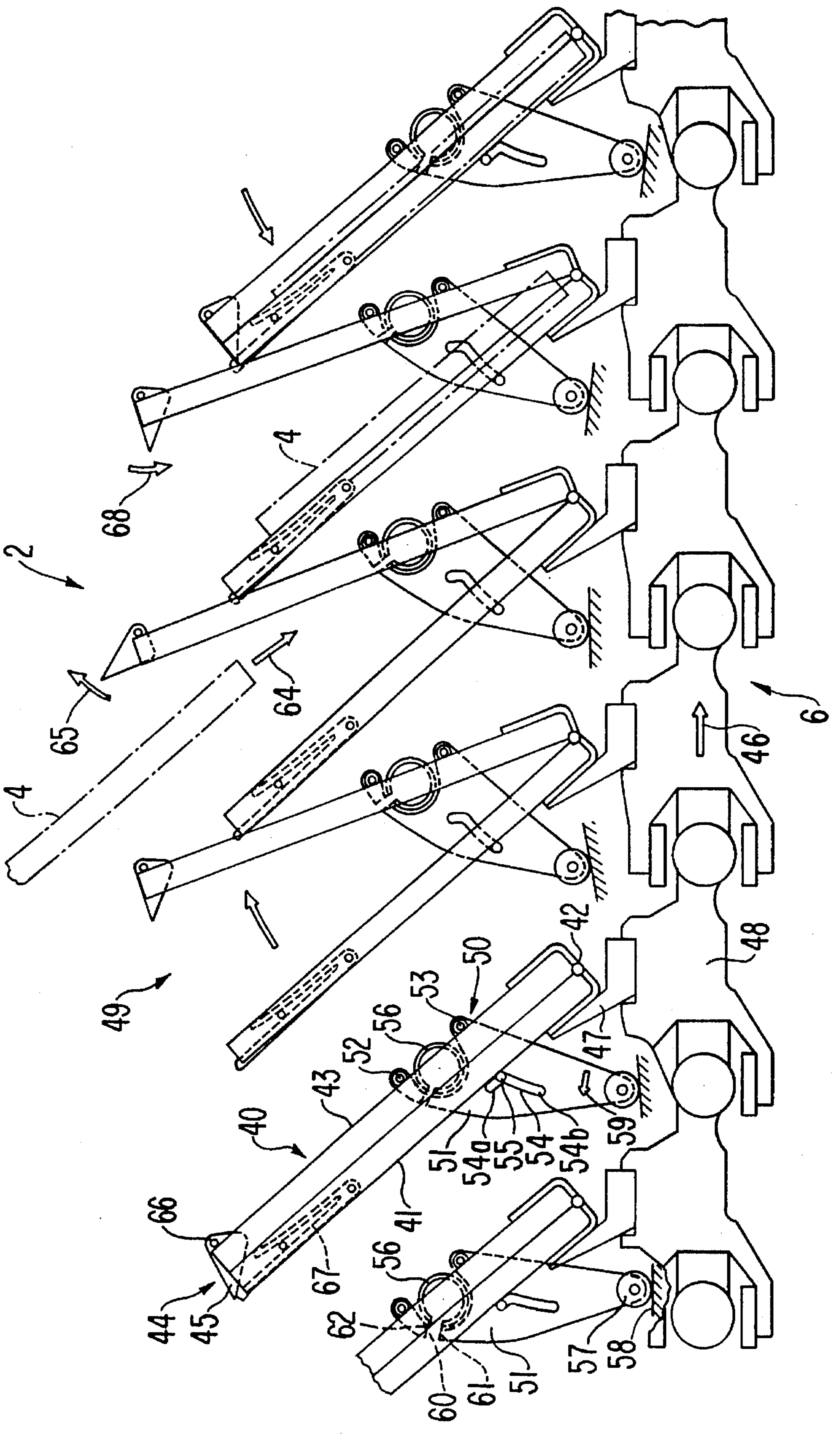
FIG. 9 is a schematic view of another embodiment of the conveyor apparatus of the invention in a loading region.
Figure 10:
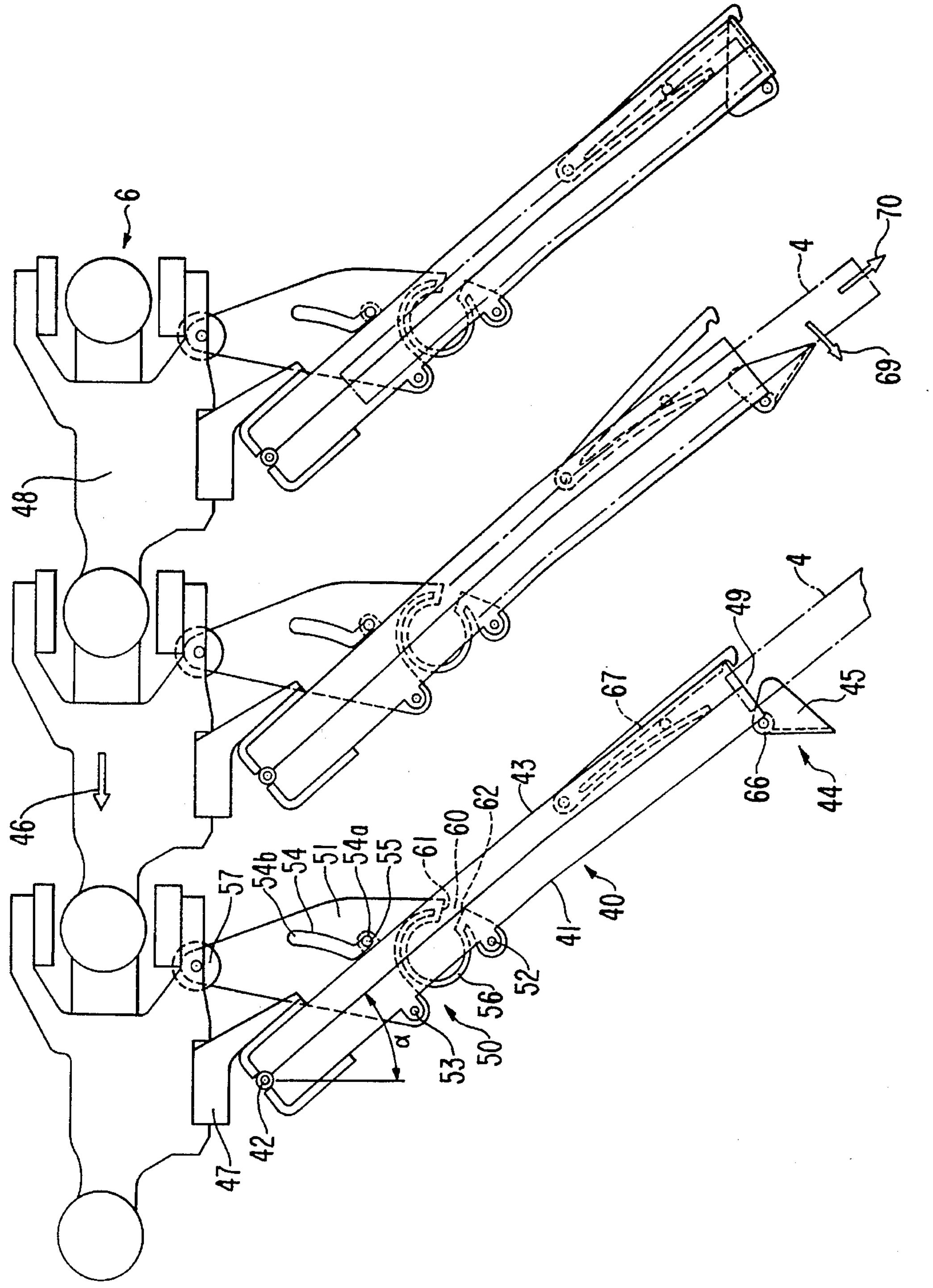
FIG. 10 schematically shows a view of the ejection region in the of the embodiment of FIG. 9.

A locking and pivoting apparatus 50 is attached laterally to each pivotable side wall 43, between shaft 42 and the loading and emptying opening 49, with only the forward pivoting apparatus being visible in FIGS. 9 and 10. Apparatuses 50 each have a plate 51, for example of plastic, which is fixedly connected to side wall 43 at two attachment locations 52 and 53, and which has a slot 54 provided with a latching region 54*a*, into which a pin 55 attached to side wall 41 extends. Plate 51 is configured as a spring 56 between latching region 54*a* and the two attachment locations 52 and 53. If pin 55 is located in latching region 54*a*, as on the far left and far right in FIG. 9, spring 56 is tensed and presses side wall 43 against side wall 41. If plate 51 is now pivoted in the direction of arrow 59 by means of a roller 57 attached thereto, and by means of a guide track 58 only indicated schematically here, plate 51 is locked to pin 55, and a gap 60 between two opposite surfaces 61 and 62 of plate 51 is closed. If roller 57 is moved further in the direction of arrow 46, side wall 43 pivots plate 51 around shaft 42 until pin 55 has reached an end 54*b* of slot 54. A movement of roller 57 in the opposite direction causes a counter movement, and subsequently the locking of side wall 43 to side wall 41. These pivoting movements of side wall 43 are shown in FIG. 9. Seen from left to right, the upwardly-oriented opening 49 is widened in the manner of a mouth and finally re-closed. The product 4 to be loaded is guided into the widened opening diagonally from above, as shown, in the direction of arrow 64, and placed against the inclined side wall 41.

In order to keep opening 49 as clear as possible, during pivoting of side wall 43, flap 45 is simultaneously pivoted away from opening 49 around a shaft 66 in the direction of arrow 65. Flap 45 can be locked with resilient latching elements 67 connected laterally to each side wall 41.

Flap 45 can be unlocked and pivoted with a control apparatus not shown here. In this instance a movable pin is sufficient which acts upon and pivots a passing flap 45 while in one position. After loading, flap 45 is pivoted into the original position in the direction of arrow 68. After side wall 43 is pivoted back, flap 45 is locked by element 67, as shown on the far right in FIG. 9. The distance between the now-parallel side walls 41 and 43 is comparatively small, and the space between adjacent receiving apparatuses 40 is comparatively large, which is essential for the direction of the curve. Apparatus 50 permits side wall 43 to be pivoted with significantly fewer forces than in the previously described embodiment.

FIG. 10 illustrates the ejection of products 4, as already described in the above embodiment described in conjunction with FIG. 3. However, in this case side wall 43 remains locked with side wall 41, and is therefore not pivoted to eject product 4. Instead, to unblock opening 49, flap 45 is unlocked with a control pin, not shown here, and pivoted in the direction of arrow 69. Product 4 is now no longer held by flap 45, and slides gently and precisely, by means of its own weight, in the direction of arrow 70 and diagonally directly into a container 24 shown in FIG. 3. The position of product 4 is defined by the guidance of the pulling element. The optimum angle of inclination for release of products 4 can therefore be set precisely. Products 4 can then be precisely and gently placed into stacks. Ordinarily, numerous containers 24 and hence targets, are provided, into which products 4 are placed. As a consequence of the mentioned spatial accessibility, with comparatively narrow curves and S-curves, these targets can be disposed with an optimally short path for the operator.

Link chain 20 shown in FIGS. 11 through 14 is regarded as being a particularly advantageous pulling element. In contrast to the known chains of this type, in link chain 70 four rollers 71 through 74 are disposed in a plane extending transverse to the conveying direction, and are rigidly connected to one another. Rollers 71 through 74 of a chain link 75 are thus not staggered with respect to one another in the conveying direction. It has been seen that, because of this, an improved alignment of the individual links 75 in the curves and, at the same time, a reduction in wear can be achieved. Receiving apparatuses 40 can hence be moved with greater control.

Figure 11:
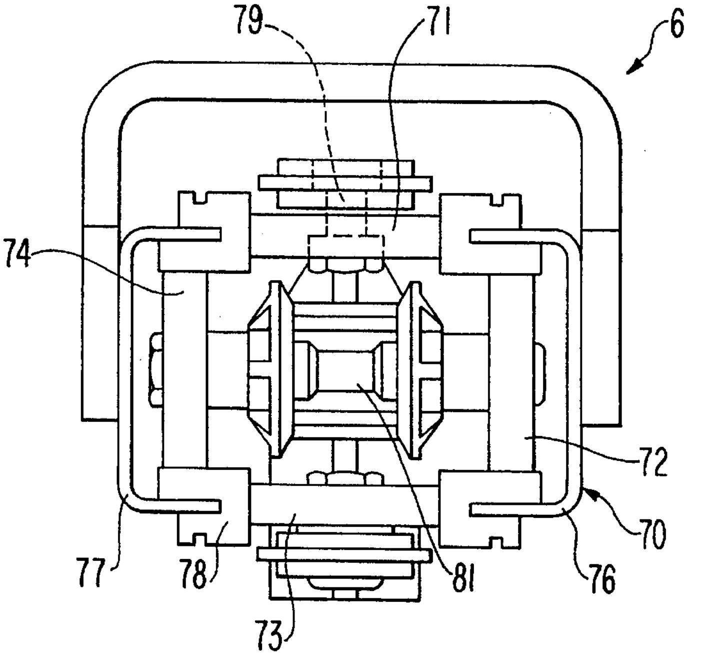
FIG. 11 is a view in partial section of a pulling element having a link chain and a rail in accordance with another aspect of the invention.
Figure 12:
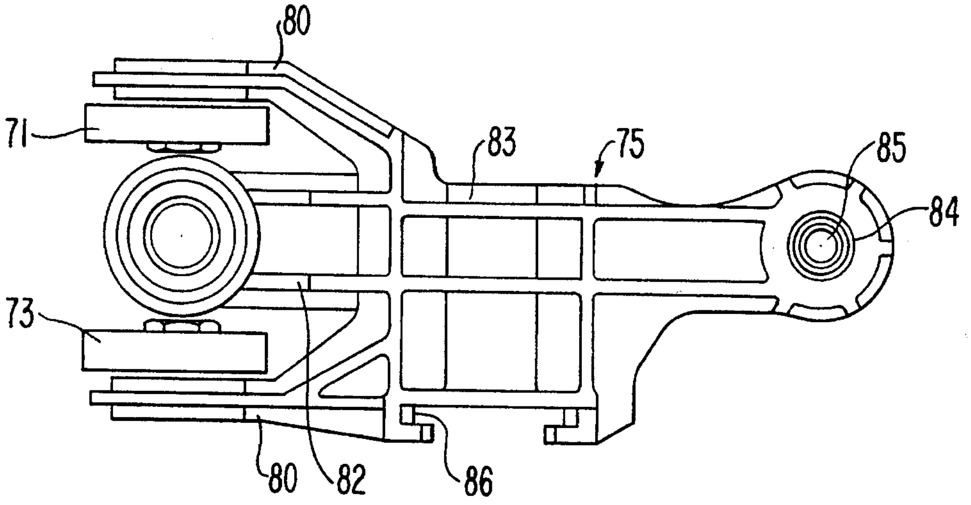
FIG. 12 is a side view of a link of the chain of FIG. 11.
Figure 13:
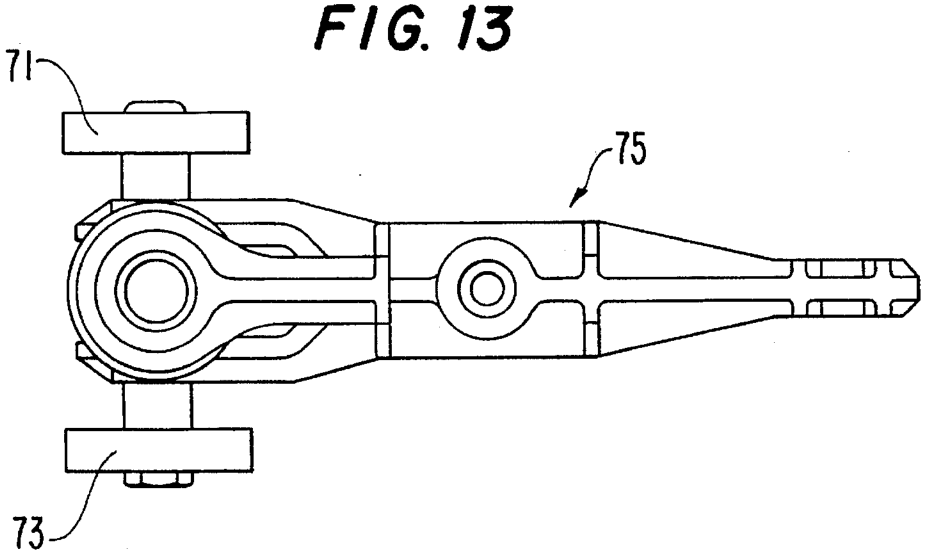
FIG. 13 is a further view of the chain link of FIG. 12.
Figure 14:
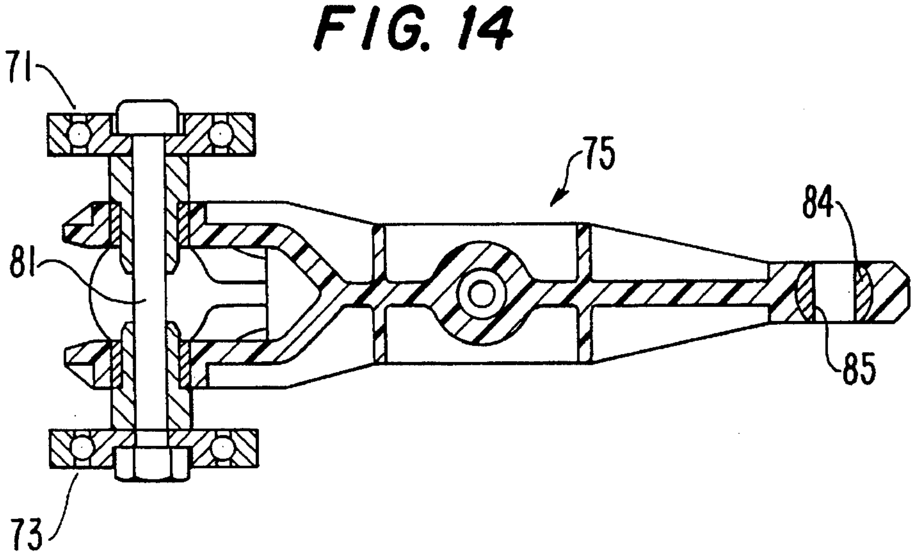
FIG. 14 is a longitudinal section through the chain link of FIG. 12.

FIG. 11 shows two rails 76 and 77 having C-shaped cross-sections, and plastic strips 78 secured thereto, between which rollers 71 through 74 are guided. The upper roller 71 and the lower roller 73 are disposed on shafts 79, on lateral brackets 80, and the two other rollers 72 and 74 are secured on a shaft 81 on a shoulder 82 of a body 83. Rollers 71 through 74 are disposed at one end of body 83, while at the other end of body 83 a bore 85 is disposed in a joint body 84 to receive the shaft 81 of the following chain link 75, not shown here. A recess 86 into which a holder 47 (FIG. 9) is pushed and secured against lateral displacement is detachably connected to each chain link 75, between the two ends of body 83. This permits simple assembly of receiving apparatuses 40. Hence, a receiving apparatus 5 can be secured to each chain link 75. Receiving apparatuses 40 are secured to links 40 so that the angle α shown in FIG. 10 is in a range of 20° to 60°, preferably in a range of 35° to 45°. When receiving apparatuses are in such a fixed position, oriented toward the rear when seen in the conveying direction, the ejection of products 4 is particularly gentle and precise.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A conveyor apparatus for conveying and distributing individually fed flat products, comprising:

a rotatingly driven pulling element defining a conveying path; and a plurality of receiving apparatuses spaced apart from one another and each having one end secured to the pulling element for being moved in a conveying direction along the conveying path, each said receiving apparatus having two side walls which are respectively spaced in the conveying direction and which form a flat receiving chamber transversely to the conveying direction having a receiving and discharge end opposite the one end presenting a closable opening, wherein the side walls of each receiving chamber have a position of incline which remains oriented backwardly with respect to the conveying direction along the entire conveying path.

2. The conveyor apparatus of claim 1, wherein each receiving apparatus includes a shaft extending transversely to the conveying direction and one of the side walls is pivotable about the shaft for opening and closing the receiving and discharge end of the receiving apparatus.

3. A conveyor apparatus as defined in claim 1, wherein said receiving apparatuses each include a seal for sealing the opening after loading the receiving chamber with product.

4. A conveyor apparatus as defined in claim 3, wherein said seal comprises a movable flap.

5. A conveyor apparatus as defined in claim 4, further including means for moving said flap away from the opening for loading.

6. A conveyor apparatus as defined in claim 3, further including means for controlling said seal to unblock the opening and for ejecting the product.

7. A conveyor apparatus as defined in claim 1, further comprising a locking apparatus respectively connected laterally to the side walls with which the opening can be controllably held in a widened and a narrowed position.

8. A conveyor apparatus as defined in claim 1, wherein said receiving apparatuses are secured to said pulling element to assume a constant diagonal position with respect to the pulling element.

9. A conveyor apparatus as defined in claim 1, wherein said pulling element comprises a link chain, and said receiving apparatuses are secured to respective links of said link chain.

10. A conveyor apparatus as defined in claim 9, wherein said links each comprise four running rollers and means for seating said rollers so that the rollers, when seen in the conveying direction, are essentially not seated in a staggered relation to one another.

* * * * *